No. 777,838. PATENTED DEC. 20, 1904.
W. L. & F. S. CARD.
CONCENTRATOR.
APPLICATION FILED FEB. 4, 1903.
NO MODEL. 6 SHEETS—SHEET 1.

Witnesses
H. S. Dieterich
G. F. Ritter

Inventors
William L. Card
Frank S. Card
by F. W. Ritter, Jr.
Attorney

No. 777,838. PATENTED DEC. 20, 1904.
W. L. & F. S. CARD.
CONCENTRATOR.
APPLICATION FILED FEB. 4, 1903.
NO MODEL. 6 SHEETS—SHEET 2.

Witnesses
Inventors
William L. Card
Frank S. Card
by F. W. Ritter, Jr.
Attorney.

No. 777,838. PATENTED DEC. 20, 1904.
W. L. & F. S. CARD.
CONCENTRATOR.
APPLICATION FILED FEB. 4, 1903.
NO MODEL. 6 SHEETS—SHEET 3.

No. 777,838. PATENTED DEC. 20, 1904.
W. L. & F. S. CARD.
CONCENTRATOR.
APPLICATION FILED FEB. 4, 1903.
NO MODEL. 6 SHEETS—SHEET 4.

Witnesses
H. G. Dieterich
G. P. Ritter

Inventors
William L. Card
Frank S. Card
by F. M. Ritter, Jr.
Attorney

No. 777,838. PATENTED DEC. 20, 1904.
W. L. & F. S. CARD.
CONCENTRATOR.
APPLICATION FILED FEB. 4, 1903.
NO MODEL. 6 SHEETS—SHEET 5.

Witnesses
H. T. Dieterich
G. P. Ritter

Inventors
William L. Card
Frank S. Card
by F. W. Ritter Jr.
Attorney

No. 777,838.  
Patented December 20, 1904.

UNITED STATES PATENT OFFICE.

WILLIAM L. CARD AND FRANK S. CARD, OF DENVER, COLORADO.

CONCENTRATOR.

SPECIFICATION forming part of Letters Patent No. 777,838, dated December 20, 1904.

Application filed February 4, 1903. Serial No. 141,882.

*To all whom it may concern:*

Be it known that we, WILLIAM L. CARD and FRANK S. CARD, citizens of the United States, residing at Denver, in the county of Denver, State of Colorado, have invented certain new and useful Improvements in Concentrators; and we hereby declare the following to be a full, clear, and exact description of the same, reference being had to the accompanying drawings, in which—

Fig. 11 is a detached view of the end of the oscillating shaft and a sectional view of an adjustable cap and crank for the pitman of the feeder-vibrator.

Like symbols refer to like parts wherever they occur.

Our invention relates generally to a concentrator movement for producing a variable reciprocating motion for actuating concentrator-tables where accurate adjustment of the acceleration and length of the stroke of the forward and rearward travel of the table is desired.

To this end the main feature of our invention, generally stated, embraces the combination, with a concentrator-table, of means for imparting to said table a graduated forward movement and a graduated return movement, each of which movements has an intermediate period of maximum velocity, during which the velocity is so proportioned relatively to the inertia of the material acted upon as to give to such material a rapid forward movement without destroying its stratification.

A secondary feature of our invention embraces the combination, with a concentrator-table, of a pivoted vibrator for moving said table in one direction, means for moving said table in the other direction, means for gradually shifting the point of contact away from the fulcrum of the vibrator during the first-named movement of the table and for shifting said point of contact toward said fulcrum during the return movement, and means for imparting to said vibrator a graduated movement, whereby the operative force is applied with greatest effect during the period of inertia and with the greatest leverage at the initial period of the return stroke of the table.

There are other features of invention involving particular combinations and elemental construction, all as will hereinafter more fully appear.

We will now proceed to describe our invention more fully, so that others skilled in the art to which it appertains may apply the same.

In the drawings, 1 indicates the bed-plate, and 2 2 compound pillow-blocks for the journals of the revolving and oscillating shafts 3 and 4, each of which is provided with a crank 5 and 6, respectively, which cranks are connected by an intermediate pitman 7, whereby the revolution of the crank 5 causes the oscillation of the crank 6. This pitman may be of an adjustable character—as, for instance, two interlocking members $a$ $b$, (see Fig. 7)— secured by a nut and bolt $c$ after adjustment, so that the length of the pitman may be increased or decreased at will to accelerate or retard and vary the character of the stroke; but in lieu of the adjustable pitman, if desired, interchangeable pitmen (see Fig. 8) of different lengths may be employed.

Figure 1:
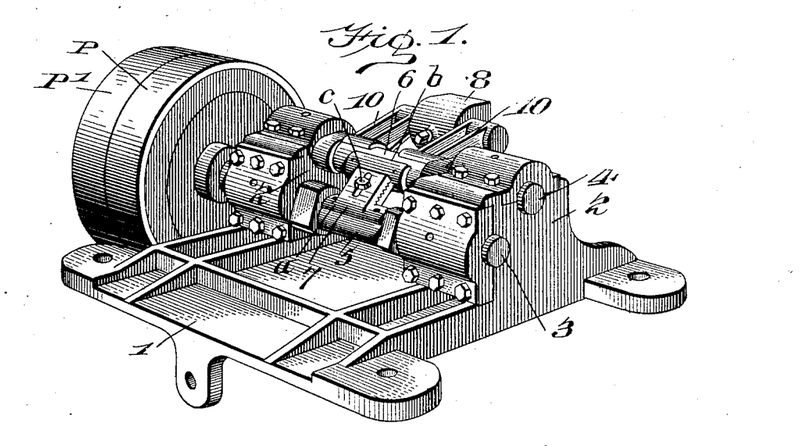
Figure 1 is a rear perspective view of a concentrator movement embodying our invention.
Figure 2:
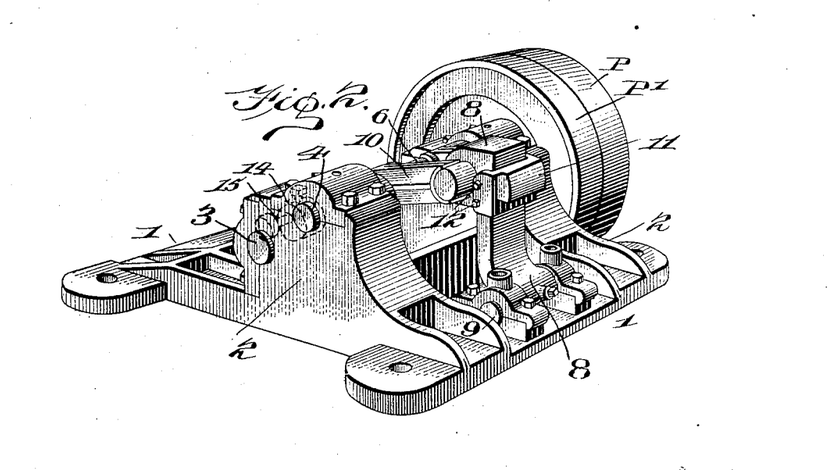
Fig. 2 is a front perspective view of the concentrator movement shown in Fig. 1.
Figures 3, 4:
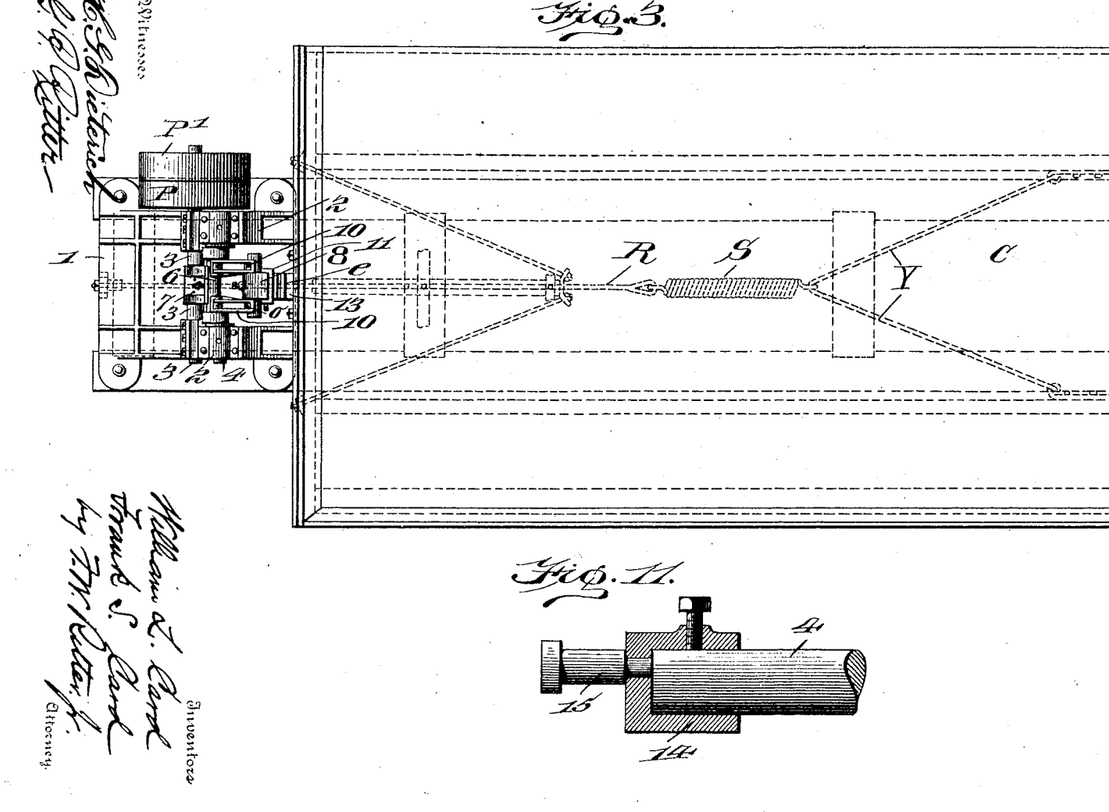
Fig. 3 is a plan view of the concentrator movement shown in connection with the plan of a concentrator-table.
Fig. 4 is an enlarged plan view of the concentrator movement shown in Figs. 1 and 2.
Figure 4:
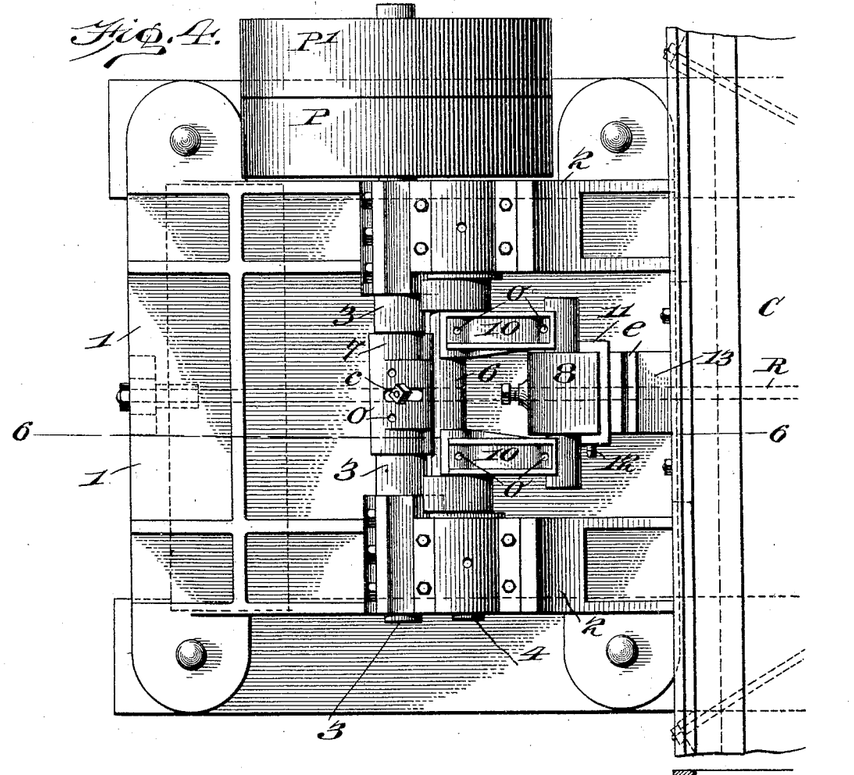
Figure 5:
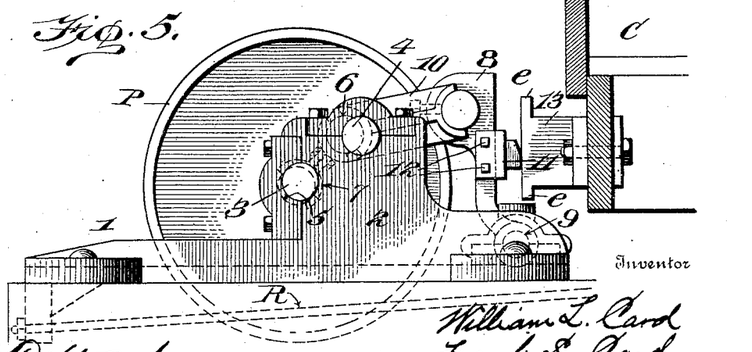
Fig. 5 is a side elevation thereof.

8 indicates a vibrating lever or "vibrator" pivoted on the bed-plate 1 in front of the oscillating shaft, as at 9, and provided at its upper end with trunnions, through the medium of which and intermediate pitmen 10 10 the vibrator is actuated from the oscillating crank 6 and imparts the travel to the concentrator-table or its equivalent. These pitmen 10 10, as shown in the drawings, it will be noted, are trough-shaped or channeled on their upper surface to form oil-recesses and perforated, as at $o$, to form ports leading to the wrist-pins, by which means lubricants may be readily distributed to the pitmen and crank connection from properly-positioned drip-cups. It will be noted from the drawings, and particularly from the diagrams Figs. 12, 13, and 14, that the distance between the pivotal center 3 and the crank 5 is less than the distance between the pivotal center 4 and crank 6 and that the latter distance is in turn less than that between the pivotal point 9 of the vibrator and the trunnions which receive the pitmen 10 10, and such a relative arrangement is preferred, as the power required to impart the impulse to the concentrator-table is thereby greatly reduced, and almost endless variations in the acceleration of the stroke are possible, thus meeting any possible requirement attendant upon the character and condition of the ore being treated. In order to vary the length of stroke or travel of the actuated device, (table,) said vibrator 8 is provided with an adjustable slide 11, which after adjustment is secured to the vibrator by set-screws 12 or in other suitable manner. The position of this slide 11 with relation to the pivot 9 of the vibrator determines the operative length of the vibrator, or, in other words, determines the length of the operative connection between the oscillating crank 6 and the concentrator-table to be operated. In the present instance (see Fig. 3) the concentrator-table C, which is to be actuated, is one wherein there is a buffer 13, with which the curved face of slide 11 of the vibrator 8 contacts, and a tension-spring S, secured to the under side of the table by a spring-bail Y and anchored to the bed-plate 1 of the movement by an adjustable tension-rod R or in other suitable manner. These reaction devices, which form no limitation of the invention, may, if preferred, be compression-springs rather than tension-springs, as will be hereinafter noted as applied to the modification of the movement. The buffer 13 in order to accommodate the vertical adjustment of slide 11 of the vibrator should preferably have its face vertically extended, (see Fig. 5,) as at $e\ e$.

Figure 12:
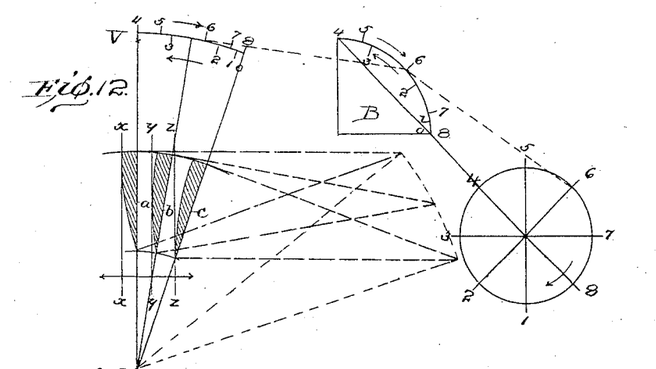
Figs. 12, 13, 14, and 15 are diagrams illustrative of the operation of the device.
Figures 13, 14, 15:
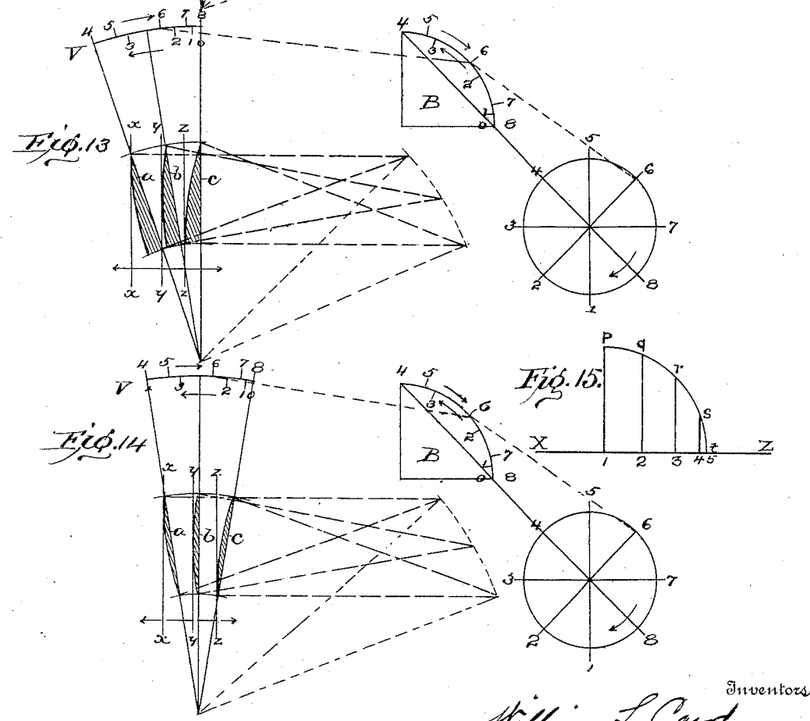

In the diagrams shown in Figs. 12, 13, and 14 the circle A represents the revolving crank, the quadrant B represents the quadrant-oscillating crank, and the short arc V represents the travel arc of the pivoted vibrator or vibrating lever to which is attached the adjustable slide 11, having the curved face for contact with the buffer 13, successive positions of the curved contact-face of the vibrator-slide being here shown at $a$, $b$, and $c$, the dotted lines between the circles A and quadrants B representing the pitman between revolving and oscillating cranks and the dotted lines between quadrants B and arcs V representing the pitmen between the oscillating crank and vibrator. It will be noted that the center of the circle A, corresponding to the center of revolution or pivotal center of the revolving crank, lies on the chord produced through the ends of the quadrant B, which is the arc traversed by the oscillating crank, and that the differentials "0" to "8" on the quadrant resulting from this arrangement of centers are transmitted to the vibrator. The line of contact of the table-buffer 13 being represented in various positions by the lines $x\ x$, $y\ y$, $z\ z$, the curved face of the slide 11 in the corresponding positions $a\ b\ c$ bears against the table-buffer at the beginning of the forward stroke at a point nearest the vibrator-pivot where there is the least movement and velocity, and as the table is progressed this point of contact recedes from the vibrator-pivot until at the center of the stroke it is represented by contact of $b$ with the line $y\ y$ and at the end of the stroke by contact of $a$ with the line $x\ x$, the contact-point in this last position being at the greatest distance from the pivotal center of the vibrator. Upon the return stroke this contact-point approaches the vibrator-pivot in reverse manner. The acceleration of the forward stroke and retardation of the rearward stroke due to this cause is apparent upon a comparison of the relative distances between the lines $x\ x$, $y\ y$, and $z\ z$.

Fig. 15 is intended to explain the differentials as to velocities and consequent accelerated forward and retarded rearward movements of the table during each stroke. Let the longitudinal movements of the table coincide with the line X Z and 1 to 5 be the length of its strokes. Then the upper (or driven) crank-center would traverse the quadrant $p\ t$. Then, supposing the upper crank to traverse the equal segments $p\ q$, $q\ r$, $r\ s$, and $s\ t$ in equal periods of time, the corresponding velocities would be 1 2, 2 3, 3 4, and 4 5. The spaces shown by the figures being traversed in the times indicated by the letters, so that when with these differentials in velocities are combined those due to variations in contact-point of curved face of slide 11 with table-buffer 13 (see Figs. 12, 13, and 14) and the time differentials due to arrangements of centers of motion, there results a mechanical movement comprising three elements, each of which augments an accelerated forward and retarded rearward movement of the table.

Fig. 13 illustrates the construction shown in the drawings, while Figs. 12 and 14, showing a variation in the forms of the curved contact-face of the adjustable sliding buffer 11, are to illustrate that such changes do not effect the acceleration and retardation due variations in the perpendicular distance from the vibrator-pivot to the vertical contact-plane between curved face of adjusting-plate 11 in its several positions $a$ $b$ $c$ and the buffer 13 in its corresponding positions $x$ $x$, $y$ $y$, $z$ $z$.

Figure 9:
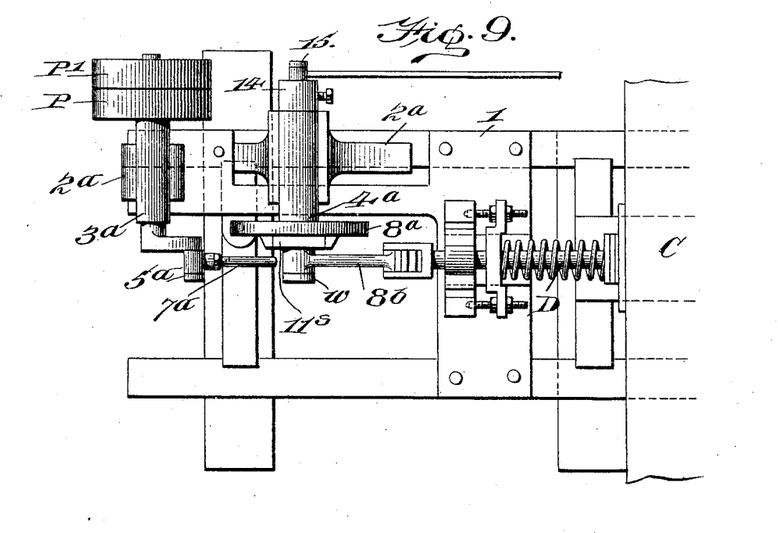
Fig. 9 is a plan view of a modification embodying our invention.
Figure 10:
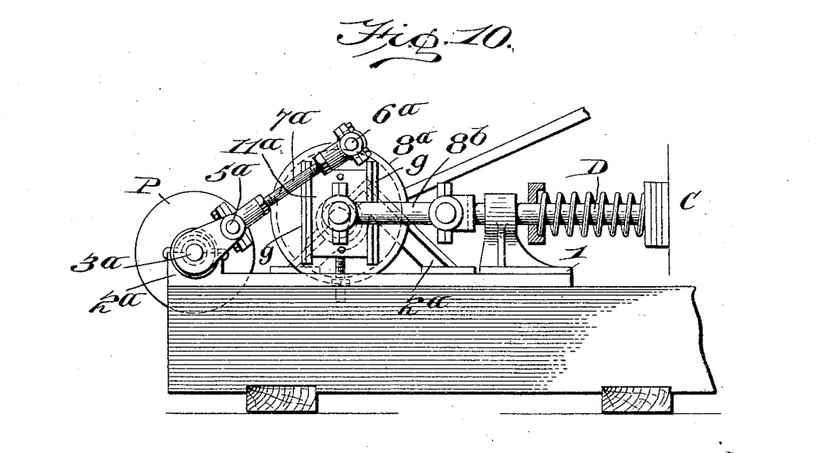
Fig. 10 is a side elevation of the modification shown in Fig. 9.

Referring to the modification shown in Figs. 9 and 10 of the drawings, $3^a$ indicates the revolving shaft having the revolving crank $5^a$, and $4^a$ indicates the oscillating shaft having the oscillating crank $6^a$, the said shafts $3^a$ and $4^a$ being journaled in independent pillow-blocks $2^a$ $2^a$ on the bed-plate 1 and the cranks $5^a$ $6^a$ being connected by the intermediate adjustable pitman $7^a$, whereby the revolution of the crank $5^a$ causes the oscillation of the crank $6^a$. The crank $6^a$ in this instance is constituted of a wrist-pin adjacent to the periphery of a disk $8^a$, secured to the end of the oscillating shaft $4^a$, and said disk is provided on its face with guides $g$ $g$ for a diametrically-disposed slide $11^s$, which is provided with a wrist-pin $w$, to which is connected the pitman $8^b$, which in turn is connected with the draw-bar D of the table. The adjustment of the slide $11^s$ so as to carry the wrist-pin $w$ to or from the axis of the oscillating shaft $4^a$ will increase or diminish the length of the connection between the movement and the table C, and thus vary the length of the stroke, while the increase or decrease of the length of the pitman connection $7^a$ between the revolving crank $5^a$ and the oscillating crank $6^a$ will vary the character of the stroke.

It will be noted that in both illustrations of our invention if the chord be drawn through the ends of the quadrant formed by the movement of the oscillating crank such chord produced will intersect the axis or center of the revolving shaft, and this arrangement we prefer in order that the arc of travel of the oscillating crank may always be above the horizontal diameter through the center of the journal of the oscillating shaft, with the result that the acceleration which may be imparted to the stroke is capable of variation within the extreme limits represented by the comparative lengths of the horizontal projections of equal increments of oscillating-crank travel arc at points adjacent to the horizontal and vertical diameters thereof. In case it is desirable to operate a second device—as, for instance, a pulp-feeder—from the movement an adjustable cap 14, provided with a wrist-pin 15, (see Fig. 11,) may be secured to the end of oscillating shaft 4 by a set-screw or in other suitable manner, the end of said shaft 4 being extended beyond the bearing for that purpose.

P P' indicate fast and loose pulleys on the shaft 3, through which and the medium of a belt power to rotate the shaft is imparted thereto and by which the belt is carried when the movement is at rest. In lieu of the pulleys and belt other driving mechanism may be employed, if desired.

Figure 6:
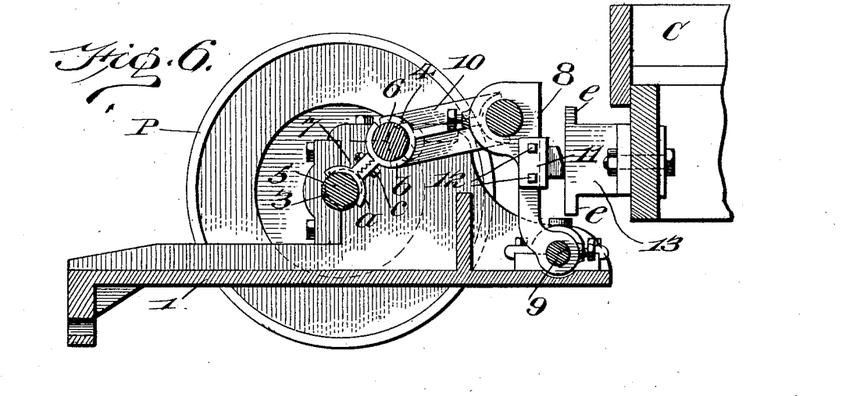
Fig. 6 is a longitudinal vertical section of the concentrator movement taken on the line 6 6, Fig. 4.
Figure 7:
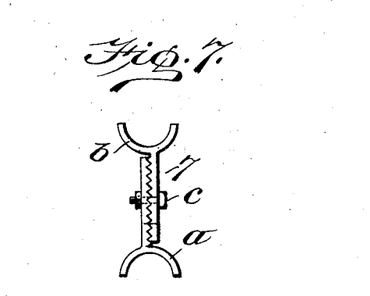
Fig. 7 is a detached view of an adjustable pitman for connecting the rotary shaft and the oscillating shaft of the concentrator movement.
Figure 8:
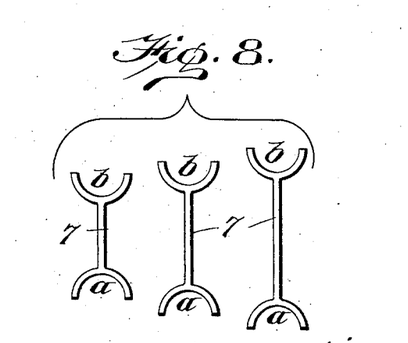
Fig. 8 is a detached view of a group of pitmen of different lengths which may be used instead of an adjustable pitman to vary the character of the concentrator movement.

The construction being of the general character and embodying the principles hereinbefore set forth, the mechanism will operate as follows: Power being applied to rotate shaft 3 ($3^a$) and revolve crank 5 ($5^a$) the forward and backward throw of the revolving crank will communicate an oscillating motion to the crank 6 ($6^a$) on shaft 4, the points of beginning and ending of the arc described by said oscillating crank being determined by the length of the intermediate pitman 7, ($7^a$,) and the acceleration of the stroke, as indicated by the horizontal projection of the arc, being varied thereby, so that the lengthening of the intermediate pitman 7, ($7^a$,) which may be accomplished either through the intervention of adjusting mechanism, as shown in Figs. 6 and 7, or the use of interchangeable-pitman members (see Fig. 8) will increase the speed of the first part and retard the latter part of the stroke, while the shortening of the pitman 7, ($7^a$,) which may be accomplished in like manner, will decrease the speed of the first part of the stroke and increase the speed of the last part of the stroke. The travel of the oscillating crank 6 ($6^a$) is communicated to the vibrator 8 ($8^a$) by the intermediate pitmen 10 10 and thence to the concentrator-table to be reciprocated, the length of the travel being determined by the adjustment of slide 11 ($11^s$,) which controls the relative length of the intermediate connections between the oscillating crank 6 ($6^a$) and the device to be operated.

It will be noted from the foregoing description and from the illustrative diagrams, Figs. 12, 13, 14, and 15, that the movement imparted to the concentrator-table C is one which beginning slowly at the inception of the forward stroke is thence accelerated by degrees up to the limit that the substrata of mineral on the concentrator-table will admit without the strata dropping behind its location on the table and to a point very near the end of the forward stroke; when it is so retarded as to cause the mineral to begin to slide forward in the channels of the table, such retardation not being so sudden as to cause a rolling mixing effect, destructive of stratification, but simply to initiate a forward sliding motion independent of the travel of the table and due to acquired momentum, at which instant the movement of the table is reversed, and as the adhesion of the mineral strata to the table has been broken the table may then safely be and is rapidly withdrawn from the forwardly-moving mineral, said return movement of the table being gently retarded and ending in a brief period of comparative rest, followed by a period of gradually-increasing velocity, during which the material on the table is again acted on as before. It will be also noted that the graduated forward movement and graduated return movement of the concentra or has each its period of maximum velocity, during which the velocity is so proportioned relatively to the inertia of the material acted upon as to impart a rapid forward movement to the material without destroying its stratification.

Having thus described our invention, what we claim, and desire to secure by Letters Patent, is—

1. In a concentrator, the combination of a revolving crank, an oscillating crank adapted to have a quadrant-travel arc, an intermediate pitman, a vibrating device actuated by the oscillating crank, and a concentrator-table actuated by the vibrating device, substantially as and for the purpose specified.

2. In a concentrator, the combination of a revolving crank, an oscillating crank adapted to have a quadrant-travel arc, an intermediate adjustable pitman, a vibrating device actuated by the oscillating crank, and a concentrator-table actuated by the vibrating device, substantially as and for the purposes specified.

3. In a concentrator, the combination of a revolving crank, an oscillating crank adapted to have a quadrant-travel arc, an intermediate pitman, an adjustable vibrating device actuated by the oscillating crank, and a concentrator-table actuated by the vibrating device, substantially as and for the purposes specified.

4. In a concentrator, the combination of a revolving crank, an oscillating crank adapted to have a quadrant-travel arc, an intermediate adjustable pitman, an adjustable vibrating device actuated by the oscillating crank, and a concentrator-table actuated by the vibrating device, substantially as and for the purposes specified.

5. In a concentrator, the combination of a revolving crank, an oscillating crank adapted to have a quadrant-travel arc, an intermediate pitman, a vibrator, a pitman intermediate of the oscillating crank and vibrator, a slide adjustable on the vibrator, and a concentrator-table actuated by the vibrator, substantially as and for the purposes specified.

6. In a concentrator, the combination of a revolving crank, an oscillating crank adapted to have a quadrant-travel arc, a pitman intermediate of said revolving and oscillating cranks, a vibrator, a pitman intermediate of the oscillating crank and vibrator, and a concentrator-table actuated by the vibrating device, substantially as and for the purposes specified.

7. In a concentrator, the combination of a revolving crank, an oscillating crank adapted to have a quadrant-travel arc, a pitman intermediate of said cranks, a vibrator, pitman intermediate of said oscillating crank and vibrator the latter pitman having oil channels and ports leading to the bearing, and a concentrator-table actuated by the vibrator, substantially as and for the purposes specified.

8. In a concentrator, the combination of an oscillating crank adapted to have a quadrant-travel arc, a revolving crank having its center of revolution on the chord produced through the ends of the arc of the travel of the oscillating crank, means whereby the movement of the revolving crank is transmitted to the oscillating crank, and a concentrator-table actuated by said devices, substantially as and for the purposes specified.

9. In a concentrator, the combination of an oscillating crank adapted to have a quadrant-travel arc, a crank having its center of revolution on the chord produced through the ends of the arc of travel of the oscillating crank, a pitman interposed between said cranks, and a concentrator-table actuated by said devices, substantially as and for the purposes specified.

10. In a concentrator, the combination of an oscillating crank adapted to have a quadrant-travel arc, a crank having its center of revolution on the chord produced through the ends of the arc of travel of the oscillating crank, means whereby the motion of one crank causes the oscillation of the other crank, and a concentrator-table actuated by said devices, substantially as and for the purposes specified.

11. In a concentrator, the combination with an oscillating crank having a quadrant-travel arc, of means for causing the oscillation of said oscillating crank, and a concentrator-table actuated thereby, substantially as and for the purposes specified.

12. In a concentrator, the combination with a concentrator-table, of a vibrator having an adjustable member provided with a curved face, and means for imparting to said vibrator alternate periods of accelerated and relatively short retarded movements, substantially as and for the purposes specified.

13. In a concentrator, the combination with a concentrator-table to be actuated, of a pivoted vibrator which contacts the table to be actuated at successively variable distances from the pivotal center of said vibrator during its operation, and means for imparting to said vibrator alternate periods of accelerated and relatively short retarded movements, substantially as and for the purposes specified.

14. In a concentrator, the combination with a concentrator-table to be actuated, of a vibrator having a curved face which contacts said table, and means for imparting to said vibrator alternate periods of accelerated and relatively short retarded movements, substantially as and for the purposes specified.

15. The combination with a concentrator-table of means for imparting to said table a graduated forward movement and a graduated return movement, each of which movements has an intermediate period of maximum velocity during which the velocity is so proportioned relatively to the inertia of the material acted upon as to give to such material a rapid forward movement without destroying its stratification, substantially as described.

16. The combination of a concentrator-table, a pivoted vibrator for moving said table in one direction, means for moving said table in the other direction, means for gradually shifting the point of contact away from the fulcrum of the vibrator during the first-named movement of the table and for shifting said point of contact toward said fulcrum during the return movement, and means for imparting to said vibrator alternate periods of accelerated and relatively short retarded movements, substantially as and for the purposes specified.

17. In a concentrator, the combination with a concentrator-table to be actuated, of a vibrator having alternate periods of accelerated and relatively short retarded movements, and means whereby said accelerated and relatively short retarded movements of the vibrator are augmented in transmission to the table to be actuated, substantially as and for the purposes specified.

18. In a concentrator, the combination with a concentrator-table to be actuated, of a vibrator having alternate periods of accelerated and relatively short retarded movements, said vibrator having a face which contacts said table whereby said accelerated and relatively short retarded movements of the vibrator are augmented in transmission to the table to be actuated, substantially as and for the purposes specified.

In testimony whereof we affix our signatures, in presence of two witnesses, this 27th day of January, 1903.

WILLIAM L. CARD.
FRANK S. CARD.

Witnesses:
CHAS. S. JACOBS,
SAML. B. MATSON.